Sept. 18, 1934.   J. F. BUHR   1,973,942
SOCKET COLLET STRUCTURE
Filed March 28, 1932

INVENTOR
Jos. F. Buhr
By C. F. Heinkel
ATTORNEY

Patented Sept. 18, 1934

1,973,942

UNITED STATES PATENT OFFICE 1,973,942

SOCKET-COLLET STRUCTURE

Joseph F. Buhr, Ann Arbor, Mich., assignor to Buhr Machine Tool Company, Ann Arbor, Mich.

Application March 28, 1932, Serial No. 601,537

12 Claims. (Cl. 279—49)

My invention relates to structures of associable sockets and collets.

Objects of my invention are: to provide a socket-collet structure with means to move and hold a collet in the socket and at the same time grip a shank in the collet and to release the collet from the socket all done by operating one means; to provide a means to removably retain the collet holding means on the collet when the same is disconnected from the socket; to provide a collet which adapts itself to a socket into which it is inserted and to a shank in the collet.

In the prior socket-collet structures, it is necessary that a drift or similar device be used to release a collet from a socket or a shank from a collet. This requires considerable time and is not conducive of preserving the life of a machine or of a socket. A chuck is required for straight shanks and requires a wrench.

Collets are now also used in screw or automatic machines for holding and releasing work. In my invention the socket-collet structure is also used for holding work or tool shanks and shanks or ends of other articles and to release them at will and to release and remove the collet from the socket.

I attain my objects by the mechanism illustratively shown in the accompanying drawing in which.

Similar reference characters refer to similar parts throughout the views.

Figure 1:
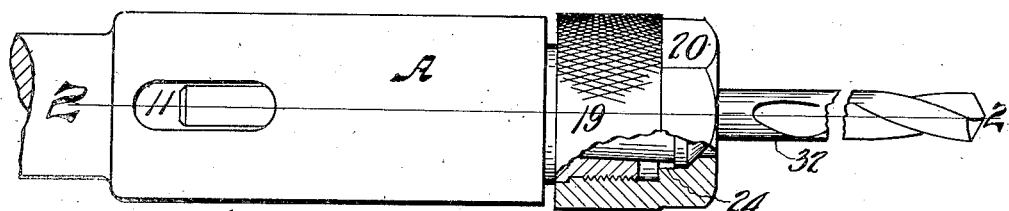
Fig. 1 is a side view of a socket-collet structure showing a portion of a socket member and a certain collet member inserted therein and a drill inserted into the collet. A portion of the socket member is in section to show interior relations of parts more clearly.

The socket A, in this instance of Fig. 1, has the longitudinal taper collet receiving opening 10 in one end thereof and the drift slot 11 transversely of the socket at the inner end of the opening.

Figure 2:
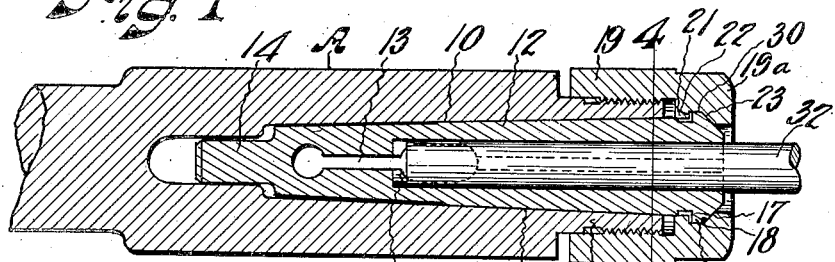
Fig. 2 is a longitudinal section taken on line 2—2 of Fig. 1 showing the releasing and clamping parts as contacting the head of the collet for release of the collet and clamping thereof according to rotation of the nut.

The collet, in this instance, has the taper body 12 corresponding to the taper of the opening 10, is preferably relieved at the rear or inner end thereof as shown in Fig. 2, and the front or outer end thereof is split or bifurcated by means of the slits 13 to provide two prongs. The driving tang 14 may or may not be used as desired.

The transverse slot 15 is located intermediate the ends of that portion of the collet which contacts the wall of the opening 10 and is an enlargement of the slits 13 for purposes appearing presently.

The slot 15 can be so located, longitudinally of the socket, that it can also be used for a driving and a drift slot to drive a tool shank out of the socket when it sticks.

The front end of the collet has the head 16 formed to provide the collet releasing shoulder 17 on the inward end of the head and the bevel or tapered clamping shoulder 18 on the outward end of the head. The releasing shoulder 17 is shown as being substantially square with the longitudinal axis of the collet but may be undercut in relation to the radial axis of the collet and the clamping shoulder is angular beveled or tapered in relation to the longitudinal axis of the collet as shown for purposes appearing presently.

The nut is threaded onto the outer diametrically reduced end of the socket and has the knurled part 19 for manipulation thereof by hand and also has the polygonal part 20 for manipulation of the nut by a wrench.

The nut has the internally extending flange 21 having the releasing shoulder 22 square with the longitudinal axis to abut the square shoulder 17 and also has the tapered bore or clamping shoulder 23 fitting to the tapered side or angular clamping shoulder 18.

The slits 13 are made sufficiently wide so that the outer end of the collet can be temporarily compressed sufficiently far so that the head 16 thereof can pass the relieved flange 21 during the act of putting the nut in place over the head of the collet and, the collet being resilient, to spring back to original position after release thereof.

Figure 8:
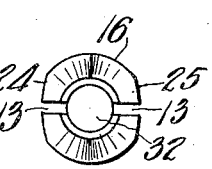
Fig. 8 is an end view of the collet of Figs. 1 and 2 showing the side relief of the head thereof.

Since the particular collet shown in Figs. 1 to 4 is bifurcated, the head 16 can be compressed in one diametrical direction only. The sides 24 and 25 of the head, are relieved, square with the slits as seen in Fig. 8 so that the head can pass the flange 21 and enter the recess 30 after it has passed the flange.

Figure 4:
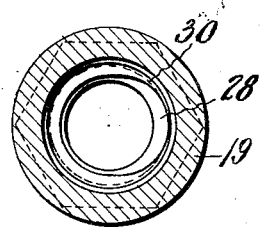
Fig. 4 is a transverse section taken on the line 4—4 of Fig. 2 showing the relief in the nut.

When the shank receiving hole 27 of the collet is too small diametrically to permit of a slit of sufficient width to permit the head to be compressed so that it will pass the flange, the portion 28 of the flange is cut away, preferably at one side as seen in Fig. 4, to compensate for whatever may be lacking in the compression of the collet so that the nut can be imposed over the end of the collet.
The collet is spring tempered to make it resilient to adapt itself to the wall of the opening 10 and the driving slot 15 reduces the cross-sectional area of the socket at that particular place and thereby forms a pivot point so that the socket can adapt itself to the wall of the opening 10 at each side longitudinally of the slot 15.

Figure 3:
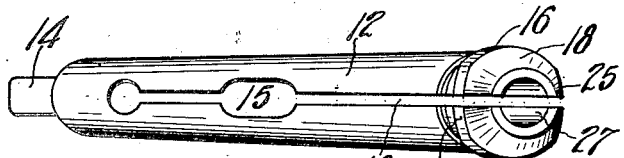
Fig. 3 is a perspective view of the collet of Fig. 1.
Figure 5:
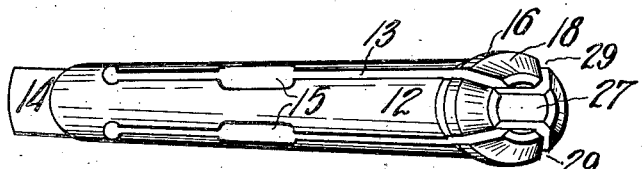
Fig. 5 is a perspective view of a collet similar to Fig. 3 showing four slits.

In Fig. 5 I have shown a collet having the same features as the collet shown in Fig. 3 except that I here use four slits 29 in place of the two in Fig. 3.
The structure of Fig. 5 is used for larger shanks and requires no side relieving of the head or the flanges since the four free ends of the collet can all be compressed to a common center sufficiently far to permit the head thereof to pass the flange in the nut for assembling of the collet and the nut and the slits can be made of sufficient width for necessary diametrical compression of the free ends of the collet prongs.

The nut and collet are assembled by imposing the nut over the threaded end of the collet and screwing the nut thereon.

In the case of Fig. 5, the collet collapses sufficiently diametrically so that the flange in the nut can pass the head 16 even when neither the flange nor the head are relieved.

During assembly of the collet and the nut, the taper clamping shoulder 18 of the head first contacts the flange 21 in the nut and the free ends of the collet are thereby compressed diametrically so that the head can pass the flange and expand diametrically after is has passed the flange and locates itself between the flange and the shoulder 22 in the nut and thereby permanently locates and holds the nut rotatably onto the collet.
The nut in this instance is adapted for threaded engagement with the diametrically reduced externally threaded end 31 of the socket.

Upon inserting the collet into the opening 10 and screwing the nut onto the end 31, by means of a hand on the knurled part thereof or a wrench on the polygonal part, the angular clamping shoulder 22 contacts the shoulder 18 on the head and thereby diametrically closes in the free end of the socket and clamps the drill 32 into the socket and also moves the collet longitudinally in the opening 10 and thereby clamps the drill shank as well as definitely installing the collet in the socket.

Whatever closing in of the free ends of the collet is occasioned by clamping the drill in the socket is made up or compensated for by the collet being adapted to compensatingly move longitudinally in the socket and adapt itself to the wall of the opening 10 due to the resiliency of the collet and the diminished area of material of the collet adjacent to the slot 15.

This clamping of the tool shank and the adaptation of the collet in the opening can be attained by a hand taking hold of the knurled part of the nut but may or can be carried to any desired degree of tightness by applying a wrench onto the polygonal part.

Upon an unscrewing movement of the nut from the socket, the collet and the drill shank are first released so that the drill can be removed from the socket and again clamped therein upon a movement to screw the nut onto the socket. A further unscrewing movement of the nut beyond the loosening of the drill pulls the collet out of the socket.

The device shown and described clamps and releases a shank and adapts a collet to a socket and secures the collet in the socket and releases the collet from the socket by the manipulation of one nut.

Figure 6:
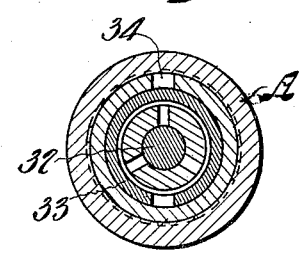
Fig. 6 is a transverse section taken on line 6—6 of Fig. 7 of a collet having three longitudinal slits and the nut threaded into the socket and a locking ring in place of the flange in the nut.
Figure 7:
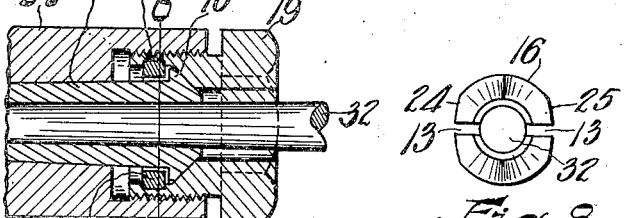
Fig. 7 shows a separate removable ring in the nut and the nut threaded into the socket and one side of the ring adapted to engage the head of the collet and spaced from the head of the collet to provide some leeway for clamping a shank.

In the modification shown in Figs. 6 and 7, I have shown a collet with three prongs with the nut threaded into the socket as distinguished from the nut threaded onto the socket and the inwardly extending flange 21 replaced by the inwardly extending split locking ring 33 sprung into a corresponding groove in the nut. In this modification, there is shown a space between the shoulder 17 and one side of the locking ring to provide some leeway for clamping and releasing of the shanks and releasing the collet so that shanks can be released without completely releasing the collet from the socket.

The socket is spring tempered to make it resilient to adapt itself to the wall of the opening 10 and the driving slot 15 reduces the cross-sectional area of the socket at that particular place and thereby forms a pivot point so that the socket can adapt itself to the wall of the opening 10.

The holes 34 in the nut serve the purpose of entering a bar to compress the head 16 for removal of the nut from the collet or to compress the ring for removal thereof from the nut.

I am aware that my invention is applicable to devices other than the drill holding device therein specifically shown and described and that changes and modifications can be made in the structure and arrangement of parts shown and described within the spirit and intent of my invention and of the appended claims; therefore, without limiting myself to the precise application of my invention as shown and described nor to the precise structure and arrangements of the parts as shown and described.

I claim:

1. A socket having a threaded part, a collet insertable into said socket, a nut threaded onto said threaded part to hold said collet to said socket, means for supporting said nut on said collet while the same is out of said socket, and a part of said nut having a part eccentrically relieved to clear said collet to permit of removal of said nut from said collet upon an unrotating sidewise movement of said nut relative to said collet.

2. A socket, a collet having an end thereof inserted into said socket, a nut axially movably threaded onto said socket, cooperating shoulder means internally of said nut and externally of said collet to normally retain said nut on said collet and to axially move said collet relative to said socket, and a relief in one side of said shoulder means to clear the co-operating shoulder means upon an arcuate sidewise movement of said nut relative to said socket and to said collet for removal of said nut from said collet.

3. A socket, a collet having an end thereof inserted into and axially movable in said socket, a radial flange on said collet and located outside of said socket, an operating nut axially movably threaded onto an end of said socket, an annular flange within said nut to engage said radial flange for axial movement of said collet relative to said socket upon rotative movement of said nut, and a relief in one side of said annular flange to clear said radial flange upon an arcuate sidewise movement of said nut relative to said socket and to said collet for removal of said nut from said collet.

4. A socket, a collet having an end thereof inserted into and axially movable in said socket, a radial flange on said collet and located outside of said socket, an operating nut axially movably threaded onto an end of said socket, an annular flange within said nut to engage said radial flange for axial movement of said collet relative to said socket upon a rotative movement of said nut, and a relief in one side of said radial flange to clear said annular flange upon an arcuate sidewise movement of said nut relative to said socket and to said collet for removal of said nut from said collet.

5. A socket, a collet having an end thereof inserted into and axially movable in said socket, a radial flange on said collet and located outside of said socket, an operating nut axially movably threaded onto an end of said socket, an annular flange within said nut to engage said radial flange for axial movement of said collet relative to said socket upon rotative movement of said nut, a relief in one side of said radial flange, and a relief in one side of said annular flange for clearance of said flanges upon an arcuate sidewise movement of said nut relative to said socket and to said collet for removal of said nut from said collet to clear said radial flange upon an arcuate sidewise movement of said nut relative to said socket and to said collet for removal of said nut from said collet.

6. A collet and collet clamping and withdrawing unit assemblage comprising a nut having an internal, substantially annular, radially extending retaining flange, defining an opening, a collet longitudinally split for resilient reduction of the diameter of one end thereof and having an external, substantially annular, radially extending shoulder on said end of greater diameter than the opening defined by said flange for locking said collet and nut together, said shoulder having reduced sides, and a relieved portion in said flange providing an elongation of the opening defined by said flange, cooperating with said reduced sides to permit the insertion of said shoulder while said collet end is reduced in diameter by compression, behind said retaining flange, whereby upon release of the compression said collet shoulder expands into overlapping engagement with the radially extending flange of said nut.

7. A collet and collet clamping and withdrawing unit assemblage comprising a nut having an internal, substantially annular, radially extending flange defining an opening, a collet having a longitudinal split defining two jaws for resilient reduction of the diameter of one end thereof and having an external, substantially annular, radially extending shoulder on said end of greater diameter than the opening defined by said flange for locking said collet and nut together, said shoulder having reduced sides for reducing the overall width of said collet in a direction perpendicular to the line of resilient movement of said jaws, and a relieved portion in said flange providing an elongation of the opening defined by said flange, cooperating with said reduced sides to permit the insertion of said shoulder while said collet end is reduced in diameter by compression, behind said retaining flange, whereby upon release of the compression said collet shoulder expands into overlapping engagement with the radially extending flange of said nut.

8. A collet and collet clamping and withdrawing nut assemblage comprising a nut having a tapered bore for engaging the tapered head of a collet, adapted to be threaded upon a socket and including an internal substantially annular flange, a collet longitudinally split to provide two jaws resiliently compressible inwardly in one direction, defining a tapered head for engagement with said tapered bore and an external substantially annular shoulder, diametrically opposed portions of said shoulder being flattened across said split to reduce the overall extent thereof in a direction perpendicular to the line of resilient movement of said jaws, said internal shoulder being eccentrically relieved to enable said head upon compression to be assembled within said nut with a sidewise movement to bring said internal and external shoulders into overlapping relation for locking said nut to said collet.

9. A collet and collet clamping and withdrawing nut assemblage comprising a nut having a tapered bore for engaging the tapered head of a collet, adapted to be threaded upon a socket and including an internal substantially annular flange, a collet longitudinally split to provide jaws resiliently compressible inwardly in one direction, defining a tapered head for engagement with said tapered bore and an external substantially annular shoulder, diametrically opposed portions of said shoulder being flattened to reduce the overall extent thereof in another direction, said internal shoulder being eccentrically relieved to enable said head upon compression to be assembled within said nut with a sidewise movement to bring said internal and external shoulders into overlapping relation for locking said nut to said collet.

10. A collet and collet clamping and withdrawing nut assemblage comprising a nut having a tapered bore, adapted to be threaded on a socket and including an internal substantially annular flange defining an opening, a collet longitudinally split to provide two jaws resiliently compressible inwardly in one direction defining a tapered head for engagement with said tapered bore and an external substantially annular shoulder, the diametrical width of said shoulder in the direction of said compression when compressed inwardly being greater than the opening defined by said flange, said shoulder having diametrically opposed portions flattened to reduce the overall width thereof in a direction perpendicular to the movement of said jaws during compression and an internal relief defined by said flange to enable said head, upon compression, to be assembled within said nut with a sidewise movement to bring said flange and external shoulder into overlapping relation on the outward movement of said jaws when the compression therein is released to lock said collet and nut together.

11. A collet and collet clamping and withdrawing nut assemblage wherein the nut is threaded for threadably engaging with a collet socket for clamping the collet within the socket and withdrawing the collet from the socket, comprising a nut having two axially spaced and aligned internal shoulders, one of said shoulders defining an opening, a collet longitudinally split to provide two resilient jaws compressible inwardly in one direction, having axially aligned external shoulders for axially aligned disposition between said internal shoulders when said nut is assembled thereon, diametrically opposed flattened portions on said external shoulders reducing the overall width thereof in a direction perpendicular to the movement of said jaws during compression to a width substantially equal to said opening and an eccentrically relieved portion defined by one of said internal shoulders defining an opening to enable said external shoulders to be inserted between said internal shoulders upon compression of said jaws and sidewise movement of the same.

12. A collet and collet clamping and withdrawing nut assemblage comprising a nut having an internal substantially annular, radially extending, retaining flange, a collet longitudinally split for resilient inward compression having an external, substantially annular, radially extending shoulder on the split end thereof overlapping said flange for locking said collet and nut together, said shoulder having reduced sides, and a relieved portion in said flange defined thereby for permitting, together with said reduced sides, the eccentric insertion or removal of said shoulder while in a compressed state, behind said retaining flange whereby upon release of the compression in said collet and the clamping of said collet in a socket by said nut, said shoulder and collet assume a concentric position with respect to said nut.

JOSEPH F. BUHR.